US008219831B2

(12) United States Patent
Chaudhry et al.

(10) Patent No.: US 8,219,831 B2
(45) Date of Patent: Jul. 10, 2012

(54) REDUCING TEMPERATURE AND POWER BY INSTRUCTION THROTTLING AT DECODE STAGE OF PROCESSOR PIPELINE IN TIME CONSTANT DURATION STEPS

(75) Inventors: Shailender Chaudhry, San Francisco, CA (US); Quinn A. Jacobson, Sunnyvale, CA (US); Marc Tremblay, Menlo Park, CA (US)

(73) Assignee: Oracle America, Inc., Redwood Shores, CA (US)

( * ) Notice: Subject to any disclaimer, the term of this patent is extended or adjusted under 35 U.S.C. 154(b) by 572 days.

(21) Appl. No.: 12/361,422

(22) Filed: Jan. 28, 2009
(Under 37 CFR 1.47)

(65) Prior Publication Data

US 2010/0191993 A1   Jul. 29, 2010

(51) Int. Cl.
*G06F 1/32* (2006.01)
*G06F 9/30* (2006.01)
(52) U.S. Cl. ........................................ 713/300; 712/208
(58) Field of Classification Search .................. None
See application file for complete search history.

(56) References Cited

U.S. PATENT DOCUMENTS

| 6,564,328 B1 * | 5/2003 | Grochowski et al. ......... 713/320 |
| 7,051,221 B2 * | 5/2006 | Clabes et al. ................ 713/320 |
| 7,330,988 B2 | 2/2008 | Golla et al. |
| 2004/0064745 A1 * | 4/2004 | Kadambi ...................... 713/322 |
| 2006/0020831 A1 | 1/2006 | Golla et al. |
| 2007/0226465 A1 | 9/2007 | Chaudhry et al. |
| 2009/0164812 A1 * | 6/2009 | Capps et al. .................. 713/320 |

FOREIGN PATENT DOCUMENTS

| GB | 2 317 977 | 4/1998 |
| WO | WO 02/25414 | 3/2002 |

OTHER PUBLICATIONS

Skadron et al., "Temperature-Aware Microarchitecture", *Proceedings of the 30th Annual International Symposium on Computer Architecture*, Jun. 9, 2003, pp. 2-13, IEEE, Los Alamitos, CA (XP-010796916).

* cited by examiner

*Primary Examiner* — Kenneth Kim
(74) *Attorney, Agent, or Firm* — Fliesler Meyer LLP

(57) ABSTRACT

A processor includes a device providing a throttling power output signal. The throttling power output signal is used to determine when to logically throttle the power consumed by the processor. At least one core in the processor includes a pipeline having a decode pipe; and a logical power throttling unit coupled to the device to receive the output signal, and coupled to the decode pipe. Following the logical power throttling unit receiving the power throttling output signal satisfying a predetermined criterion, the logical power throttling unit causes the decode pipe to reduce an average number of instructions decoded per processor cycle without physically changing the processor cycle or any processor supply voltages.

19 Claims, 11 Drawing Sheets

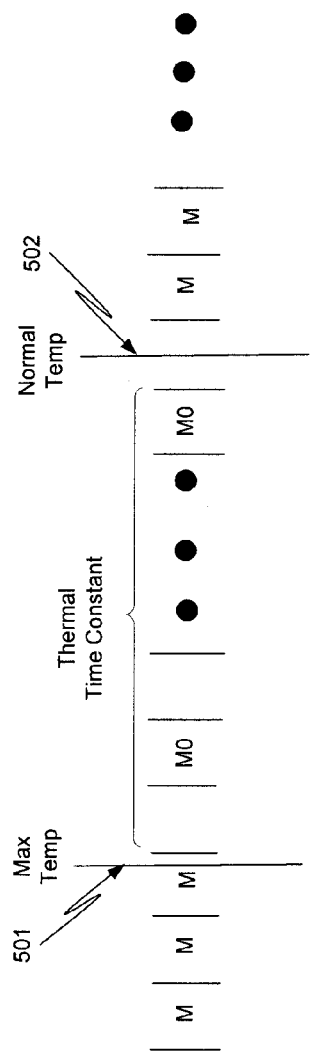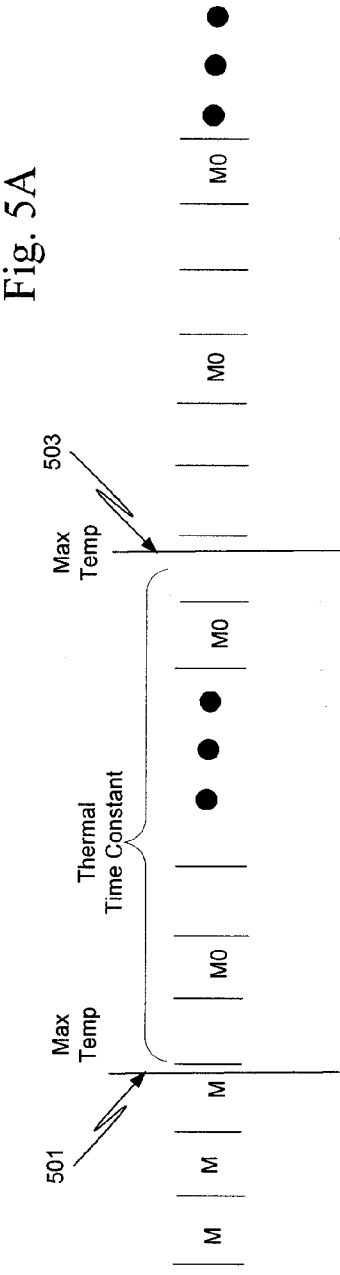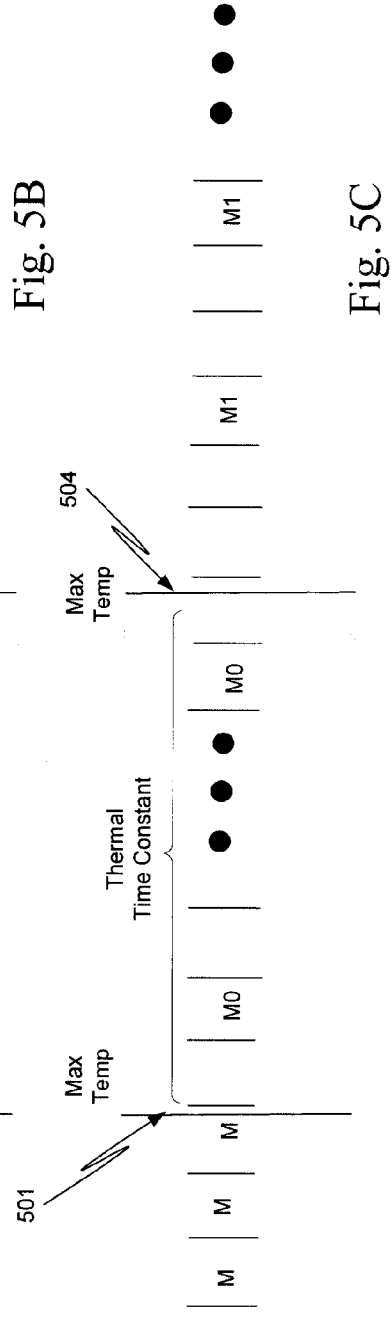

REDUCING TEMPERATURE AND POWER BY INSTRUCTION THROTTLING AT DECODE STAGE OF PROCESSOR PIPELINE IN TIME CONSTANT DURATION STEPS

BACKGROUND OF THE INVENTION

1. Field of the Invention

The present invention relates generally to power management of microprocessors, and more particularly to logical methods for saving power in a multi-core processor.

2. Description of Related Art

Power management in processors has become increasingly important as the processing power has increased. Several methods have been used to reduce power consumption in processors.

Typically, these methods consider adjusting physical parameters, e.g., voltage, clock frequency, at advantageous times to reduce power consumption. Many different methods reduced power consumption by scaling the frequency and/or the voltage. These methods relied upon physically changing the frequency and/or the voltage.

SUMMARY OF THE INVENTION

In one embodiment, a processor includes a device providing a power throttling output signal. The power throttling output signal is used to determine when to logically throttle the power consumed by the processor. For example, a core in the processor includes a pipeline having a decode pipe and a logical power throttling unit. The logical power throttling unit is coupled to the device to receive the power throttling output signal. The logical power throttling unit also is coupled to the decode pipe.

When the power throttling output signal received by the logical power throttling unit satisfies a predetermined criterion, the logical power throttling unit causes the decode pipe to reduce an average number of instructions decoded per processor cycle without physically changing the processor cycle, i.e., without physically changing any of a processor cycle time and processor supply voltage levels.

Thus, in contrast to the prior art that changed one or more physical parameters to reduce power consumption, the power consumption is reduced by logically throttling the number of instructions executed, which by itself can reduce the power consumption. An advantage of logical throttling (changing the number of instructions decoded in a given time period) vs. physical throttling (physically changing a processor cycle time and/or processor supply voltage levels) is that the entire physical design (100's of millions of transistors and tens of thousands of timing paths) does not need to be re-simulated, or re-characterized to check if the physical design meets timing (min and max) and if the physical design functions correctly at lower supply voltage levels.

In one embodiment, the average number of instructions decoded per processor cycle is reduced by increasing a number of processor cycles between processor cycles in which instructions are decoded. In another embodiment, the average number of instructions decoded per processor cycle is reduced by decreasing a number of instructions decoded in a single processor cycle.

As an example, prior to receiving the power throttling output signal satisfying the predetermined criterion, the decode pipe decodes M instructions in each processor cycle in which instructions are decoded where M is an integer greater than one. Following receiving the power throttling output signal satisfying the predetermined criterion, the decode pipe decodes, for example, one instruction in each processor cycle in which instructions are decoded.

In another embodiment, the device includes a temperature sensor. The power throttling output signal from the device represents a temperature and is referred to as a temperature signal. The predetermined criterion for limiting decoding of instructions is the temperature signal being equal to or greater than a maximum temperature signal. While this sensor is physical, the sensor feeds the strictly logical power throttling described above.

In yet another embodiment, the device includes a clock. The power throttling output signal from the clock represents a time of day and so is referred to as a time of day signal. The predetermined criterion for limiting decoding of instructions with this embodiment of the device is that the time of day signal is after a power reduction start time and before a power reduction end time. Again, while this sensor is physical, the sensor feeds the strictly logical power throttling described above.

In still yet another embodiment, the device includes executing software that can cause an independent power throttling output signal to be provided to each core on a single chip. The power throttling output signal from the executing software represents an instruction execution load. The predetermined criterion is one of an increase in the instruction execution load and a decrease in the instruction execution load. If the core is executing a maximum number of instructions, the increase in instruction execution load has no effect on the number of instructions executed in a given time period by that core.

With this processor, a method of logically throttling power consumption includes monitoring a power throttling output signal having at least two states. A first state is indicative of normal operation and a second state is indicative of a need to throttle power consumption. A first average number of instructions per processor cycle is decoded, in a decode pipe in a pipeline of the computer processor, when the power throttling output signal has the first state. A second average number of instructions per processor cycle is decoded in the decode pipe when the power throttling output signal has the second state. The first average number is greater than the second average number.

In one embodiment of this method, the decoding a second average number of instructions per processor cycle includes increasing a number of processor cycles between processor cycles in which instructions are decoded. In another embodiment of this method, the decoding a second average number of instructions per processor cycle includes decreasing a number of instructions decoded in a single processor cycle.

In yet another embodiment of this method, the power throttling output signal is indicative of a temperature and so is referred to as a temperature signal. The second state of the temperature signal is the temperature signal being equal to or greater than a maximum temperature signal. In still yet another embodiment of this method, the power throttling output signal is indicative of a time of day and so is referred to as a time of day signal. The second state of the time of day signal indicates that the time of day is after a power reduction start time and before a power reduction end time.

BRIEF DESCRIPTION OF THE DRAWINGS

FIGS. 5A to 5C illustrate alternative implementations of logical power throttling where both the number of processor cycles between processor cycles in which instructions are decoded is increased and the number of processor cycles decoded in a processor cycle is decreased.

In the drawings, elements with the same reference numeral are the same or equivalent elements. Also, the first digit of a reference numeral is the figure number of the figure in which that element first appears.

DETAILED DESCRIPTION

Figure 1:
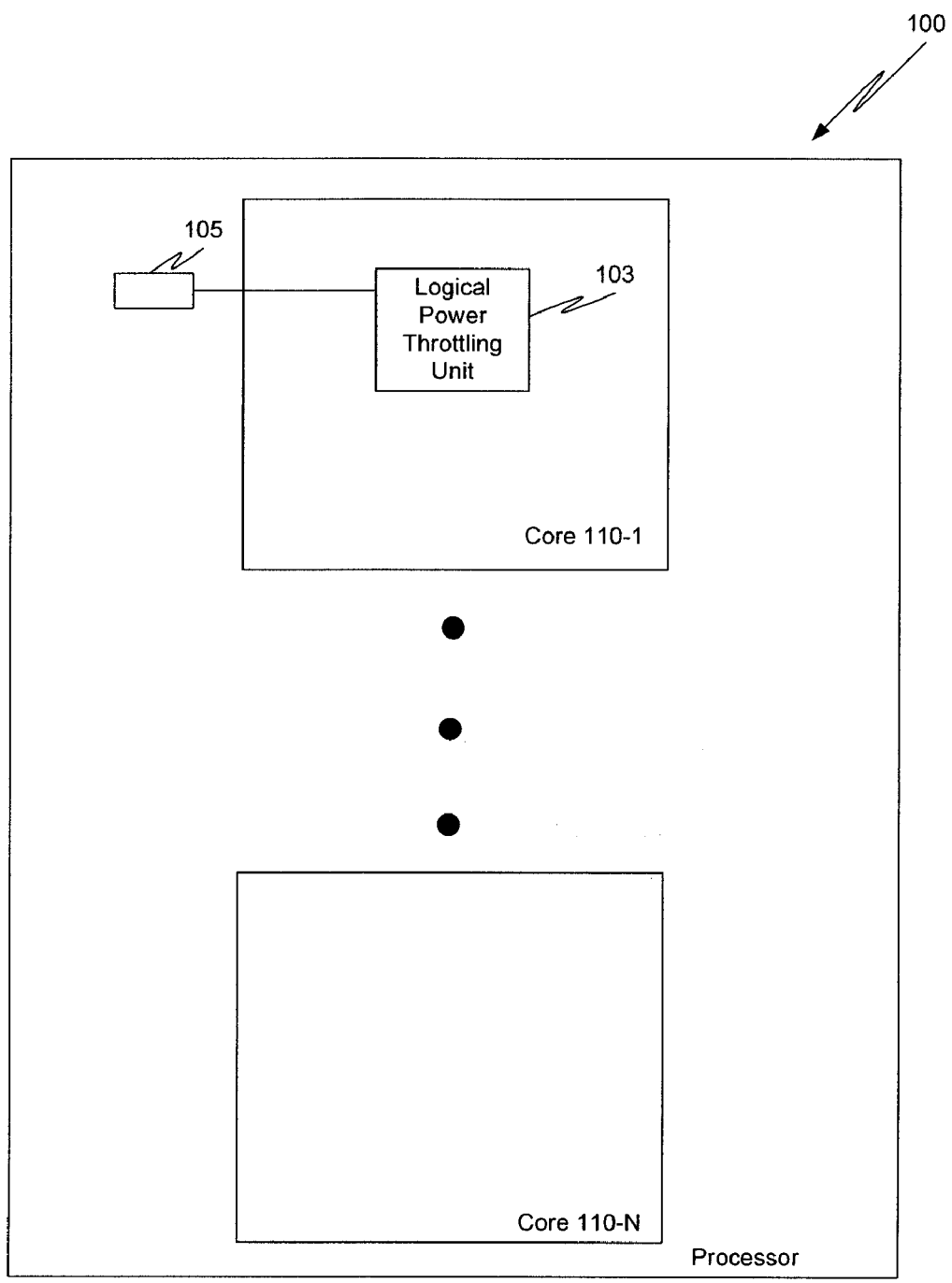
FIG. 1 is a block diagram of a multi-core processor with logical power throttling according to one embodiment of the invention.

According to one embodiment of this invention, a processor 100 includes a plurality of cores 110-i, where i ranges from 1 to N. Even when the power consumption is about 10 watts per core 110-i, a processor 100 with sixteen such cores, e.g., N is sixteen, uses 160 watts.

Thus, in one embodiment, at least one core 110-1 includes a logical power throttling unit 103. Logical power throttling unit 103 is coupled to a device 105 that provides a power throttling output signal. The power throttling output signal has at least two states. A first state is indicative of normal operation, while a second state is indicative of a need to throttle power consumption.

Logical power throttling unit 103 monitors the state of the power throttling output signal from device 105 and when the second state is detected causes core 110-1 to reduce an average number of instructions decoded per processor cycle without physically changing the processor cycle. Herein, a processor cycle is a characteristic time period of the processor clock.

The reduction in the average number of instructions decoded per processor cycle reduces the utilization of the execution units in core 110-1, which in turn reduces the power consumption. Thus, in contrast to the prior art techniques, the power consumption is logically throttled without having to physically change any frequency or supply voltage level, i.e., without changing the processor cycle time and/or the processor supply voltage levels.

As explained more completely below, device 105 can for example be a temperature sensing device that provides a power throttling output signal to logical power throttling unit 103. The power throttling output signal is indicative of a temperature. In this case, the first state of the power throttling output signal indicates an acceptable operating temperature. The second state of the power throttling output signal indicates a predetermined maximum temperature signal or higher.

In another example, device 105 is a clock that provides a power throttling output signal to logical power throttling unit 103. The power throttling output signal is indicative of a time of day. In this example, the first state of the power throttling output signal indicates that the time of day is within a time period of normal power operations. The second state of the power throttling output signal indicates that the time of day is within a time period for reduced power operations.

In still yet another example, device 105 is executing software, for example, the operating system or system software. The executing software causes a power throttling output signal to be provided to logical power throttling unit 103. The power throttling output signal is indicative of whether load balancing is necessary. In this example, the first state of the power throttling output signal indicates that the number of instructions executed by the core is to be reduced. The second state of the power throttling output signal indicates that the number of instructions executed by the core is to be increased, or remain the same if the number of instructions executed in a single processor core is at a maximum.

In any one of, any combination of, or all of these examples, the power throttling output signal is used to determine a number of instructions decoded by a core in processor 100 in a given time period. When the number of instructions decoded in a given time period is reduced, the reduction is accomplished without changing any physical parameters, such as a frequency or a supply voltage, for processor 100. Rather, the reduction is logically accomplished, as described more completely below.

The reduction in the number of instructions decoded in a given time period reduces the number of instruction that can be executed, which in turn reduces the power consumption and the execution load for a particular core in processor 100. In one aspect, each core is independently controlled with respect to logical power throttling so, for example, the logical power throttling capability can be used for load balancing between the cores.

As explained more completely below, a given time period, as used herein, is one of a single processor cycle or a plurality of processor cycles. For example, when the given time period is a single processor cycle, if core 110-1 normally decodes four instructions in a single processor cycle, the number of instructions decoded in a single processor cycle is reduced to a number less than four, for example, one instruction. Alternatively, four instructions could be decoded in a single processor cycle, ten processor cycles allowed to pass without any decoding and then another four instructions decoded in the twelfth processor cycle. In this example, the given time period is eleven processor cycles and the number of instructions is reduced from the normal forty-four (11 cycles times 4 instructions per cycle) instructions in eleven processor cycles to four instructions in the given time period of eleven processor cycles. If the core is configured to decode the maximum number of instructions every processor cycle, the number of instructions executing is said to be a maximum.

In one embodiment, at least one temperature diode 201 (FIG. 2A) is used to monitor a temperature of the chip. As is known to those of skill, temperature diode 201 generates a signal that is correlated to the temperature that in turn is correlated to the power consumed by the chip. An analog to digital converter 202 converts the analog signal from temperature diode 201 and provides a digital temperature signal to logical power throttling unit 203 as the power throttling output signal. Thus, in this example, device 205 includes temperature diode 201 and analog-to-digital converter 202.

Logical power throttling unit 203 is connected to a decode pipe 213 in pipeline 210 of core 110-$i$. Before considering the operation of logical power throttling unit 203 in further detail, the normal operation of pipeline 210 is considered.

Pipeline 210 executes instructions and writes the results to a working register file 220. When an instruction is retired, the results for that instruction in working register file 220 are written to an architectural register file 230.

Figure 2A:
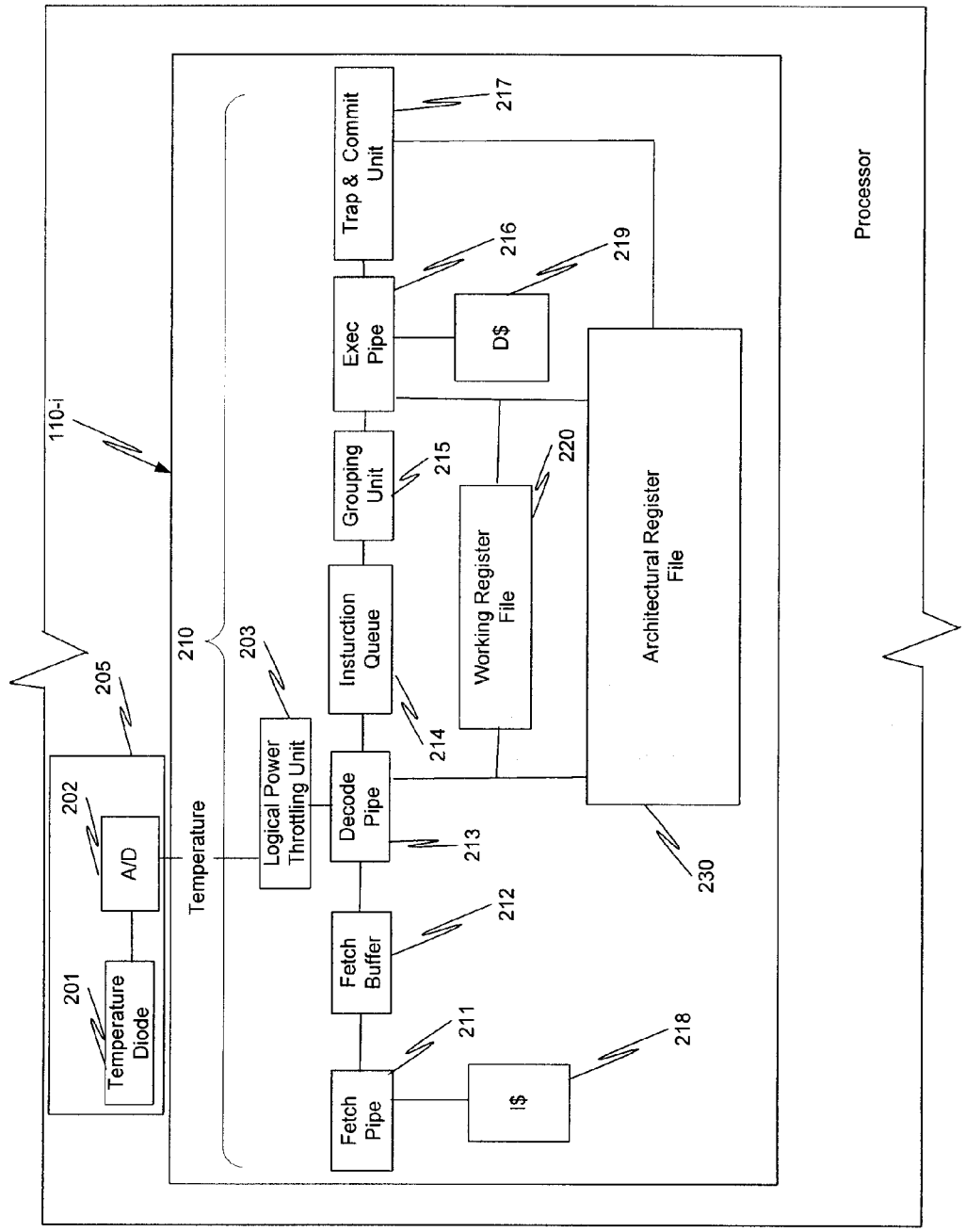
FIG. 2A is a more detailed block diagram of a representative core of processor of FIG. 1 according to one embodiment of the invention where a temperature signal is used in the logical power throttling.

As illustrated in FIG. 2A, pipeline 210 also includes a fetch pipe 211 having one or more stages. Fetch pipe 211 is coupled to an instruction store 218, e.g., a level 2 (L2) cache memory. An output of fetch pipe 211 is provided to a fetch buffer 212. In at least one embodiment, fetch buffer 212 is configured to service multiple threads.

Decode pipe 213 includes one or more stages that function to decode instructions. Decode pipe 213 is coupled to an instruction queue 214, which serves to decouple decode pipe 213 from later stages of pipeline 210.

In this example, working register file (WRF) 220 and architectural register file (ARF) 230 are coupled to decode pipe 213, an execution pipe 216, and a trap and commit unit 217.

Instructions stored in instruction queue 214 are grouped, by grouping unit 215, for execution by execution pipe 216. Execution pipe 216 is coupled to trap and commit unit 217, which commits executed instructions to architectural state in architectural register file 230. A data cache 219 is coupled to execution pipe 216. Data cache 219 provides data to execution pipe 216.

When the temperature signal received by logical power throttling unit 203 is less than a predetermined maximum temperature signal, virtual power throttle unit 203 allows processing to continue normally. However, when the temperature signal is equal to or greater than the predetermined maximum temperature signal, logical power throttling unit 203 causes decode pipe 213 to reduce the number of instructions decoded in a given time period, e.g., the average number of instructions decoded per processor cycle is reduced.

Figure 2B:
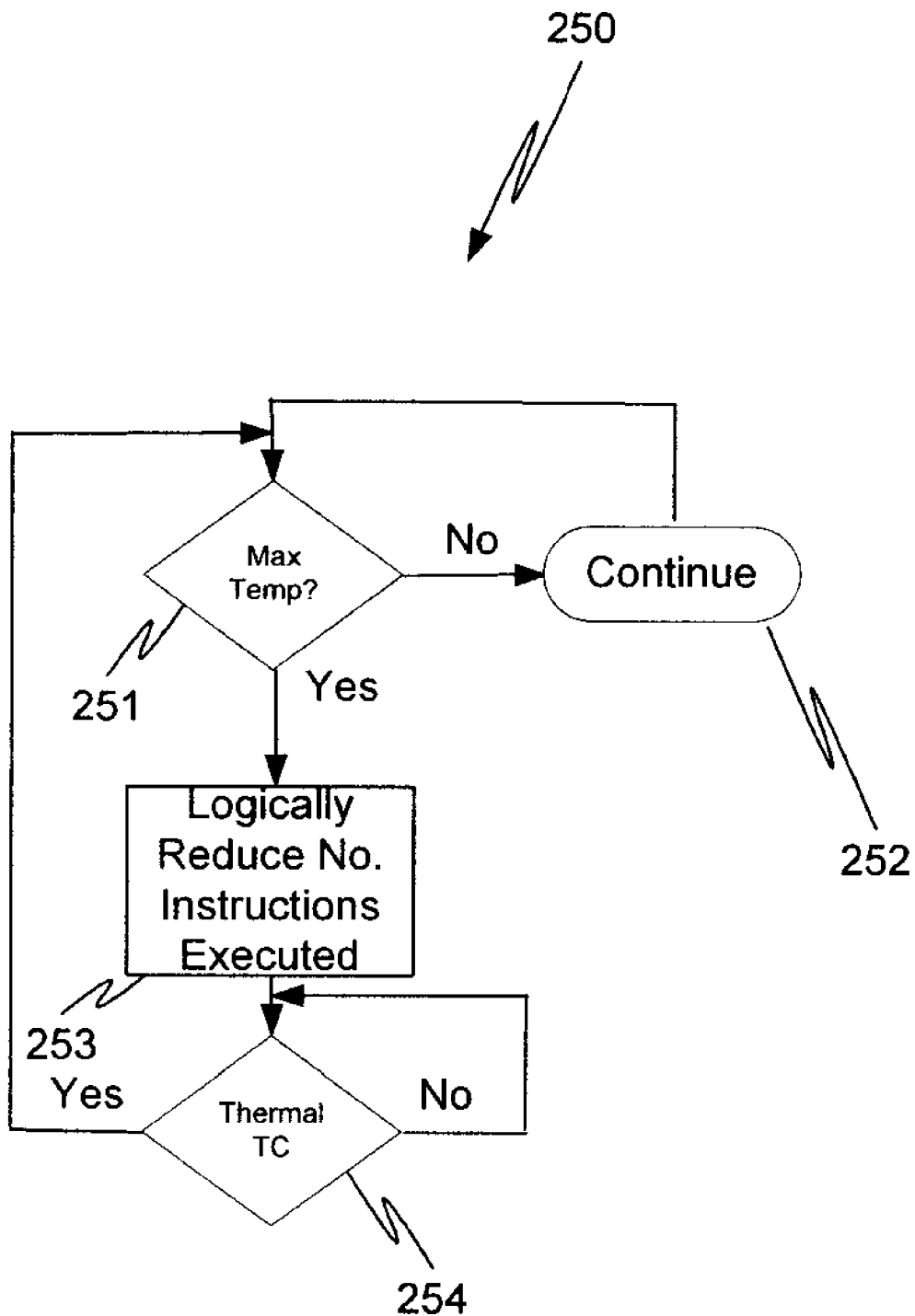
FIG. 2B is a process flow diagram for one embodiment of a method used to implement logical power throttling in the core of FIG. 2A.

FIG. 2B is a process flow diagram for a computer processor based method 250 that represents one embodiment of the logical power throttling in core 110-$i$ (FIG. 2A). Maximum temperature check operation 251 determines whether the received temperature signal is greater than or equal to a maximum temperature signal, which is correlated to a maximum power, has been detected. If a temperature signal greater than or equal to the maximum temperature signal has not been detected, processing continues normally as represented by continue 252.

When a temperature signal greater than or equal to the maximum temperature signal is detected, maximum temperature check operation 251 transfers processing to logically reduce number of instructions executed process 253. Thus, maximum temperature check operation 253 monitors the state of the output signal from device 205. When the output signal has a first state, e.g., a temperature signal less than the maximum temperature signal, pipeline 210 continues to operate normally. However, when the output signal has the second state, e.g., a temperature signal equal to or greater than the maximum temperature signal, logical power throttling unit 203 causes the power consumption to be reduced.

Specifically, in this embodiment, logically reduce number of instructions decoded process 253 throttles a number of executions decoded for execution by causing decode pipe 213 to reduce the average number of instructions decoded in a single processor cycle.

As an example, assume that pipeline 210 can decode M instructions in each processor cycle, where M is an integer. Process 253 can logically reduce the number of instructions decoded by:

1) reducing the number of instructions decoded in a given processor cycle to a number less than M;
2) extending the number of processor cycles between decoding, e.g., decoding M instructions, waiting ten processor cycles, decoding M instructions, and so on; or
3) both reducing the number of instructions decoded in a given processor cycle and extending the number of processor cycles between decodes.

Thus, process 253 causes decode pipe 213 to adjust the average number of instructions decoded per processor clock cycle and thereby reduces the power consumption because the execution units in the pipeline are idle more with the reduced number of instructions to execute.

However, even though the power consumption is reduced, the temperature response is not instantaneous. Thus, thermal time constant check operation 254 waits for a thermal time constant (thermal TC in FIG. 2B), typically on the order of milliseconds, and then transfers processing back to maximum temperature check operation 251.

If the temperature signal has fallen below the maximum temperature signal, check operation 251 transfers to continue operation 252 and core 110-$i$ resumes normal decoding and execution. If the temperature signal is still at or above the maximum temperature signal, processing again transfers to process 253 that can further reduce the number of instructions decoded per processor cycle or continue operation at the previously reduced level and simply wait another thermal time constant.

Process 250 is illustrative only and should not be interpreted as requiring polling by either check operation 251 or check operation 254. For example, events could be used to implement the checks so that processing continued normally until a maximum temperature event is indicated. Upon indication of the maximum temperature event, the number of instructions in the pipeline is logically throttled until a normal temperature event occurs after the thermal time constant and then processing returns to normal.

Also, various techniques can be used to start the logical power throttling. In the above example, a temperature signal greater than or equal to a maximum temperature signal was used as the trigger. However, in another embodiment, a given number of maximum temperature signal readings in a specified time period can be used to trigger the logical power throttling. This would be useful in situations where the processor hits peak power for a short period and then the computational load diminishes so that the power consumption was at a peak for an acceptable time period. Alternatively, the rate of change of the temperature signal could be determined from the temperature signal and logical power throttling could be triggered at a time based on a projection of reaching the maximum power using the rate of change of the temperature signal.

Figure 3A:
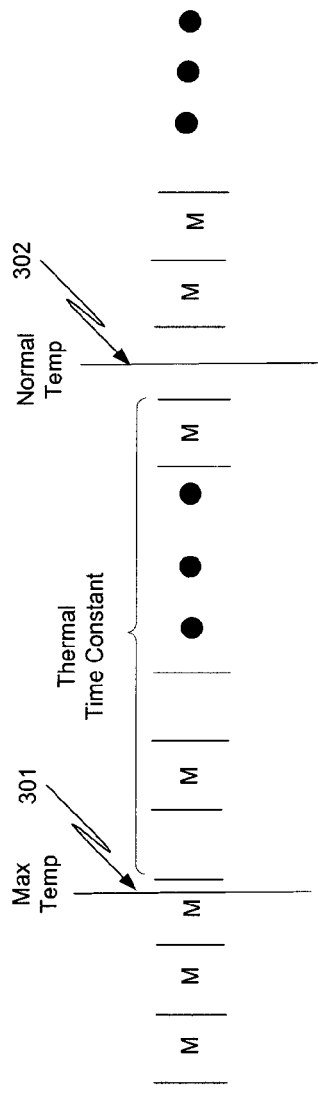
FIGS. 3A and 3B illustrate alternative implementations of logical power throttling where the number of processor cycles between processor cycles in which instructions are decoded is increased.

In the example of FIG. 3A, during normal processing M instructions are decoded during each processor cycle, in which instructions are decoded, by decode pipe 213, where M is an integer and in one embodiment is four. When logical power throttling unit 203 receives a temperature signal greater than or equal to maximum temperature signal 301, logical power throttling unit 203 configures decode pipe 213 to decode M instructions every other processor cycle as shown in FIG. 3A.

Decode pipe 213 continues decoding M instructions every other processor cycle+ for a thermal time constant. At the end of the thermal time constant, logical power throttling unit 203 samples the temperature signal and detects normal temperature signal 302. Thus, decode pipe 213 returns to decoding M instructions per processor cycle.

Figure 3B:
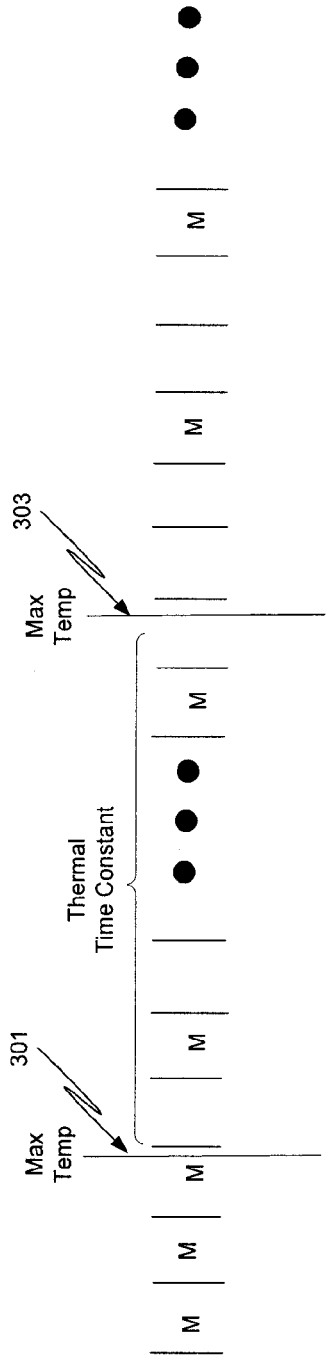

The example of FIG. 3B is similar to FIG. 3A, except when logical power throttling unit 203 samples the temperature signal after the thermal time constant, maximum temperature signal 303 is detected. In this example, logical power throttling unit 203 configures decode pipe 213 to decode M instructions every third processor cycle and after a thermal time constant resamples the temperature signal.

The examples in FIGS. 3A and 3B are illustrative only and are not intended to limit the invention to the specific embodiments disclosed. In view of this disclosure, one of skill can adjust the average number of instructions decoded per processor cycle to achieve a power reduction by decoding a specified number of instructions after a specified number of processor cycles.

In another example, during normal processing M instructions again are decoded per processor cycle by decode pipe 213, where M is an integer. When logical power throttling unit 203 receives maximum temperature signal 401, logical power throttling unit 203 configures decode pipe 213 to decode M0 instructions per processor cycle as shown in FIG. 4A, where M0 is less than M and M0 is an integer.

Decode pipe 213 continues decoding M0 instructions per processor cycle+ for a thermal time constant. At the end of the thermal time constant, logical power throttling unit 203 samples the temperature signal and detects normal temperature signal 402. Thus, decode pipe 213 returns to decoding M instructions per processor cycle.

Figure 4A:
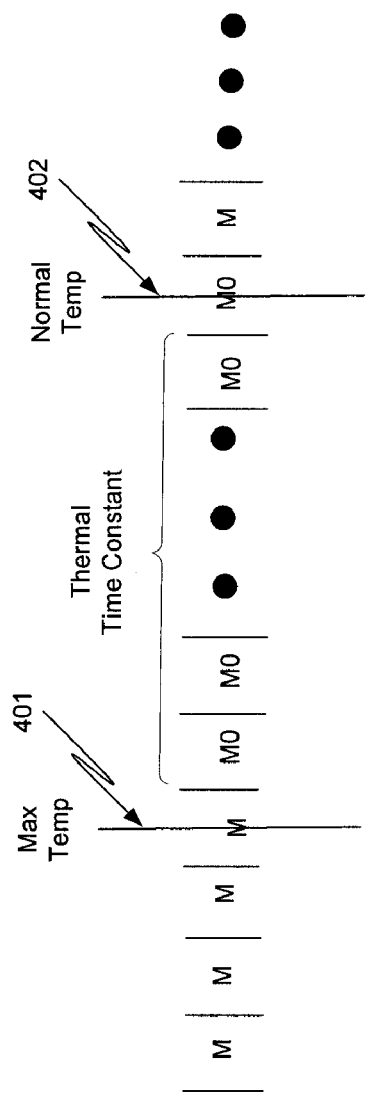
FIGS. 4A and 4B illustrate alternative implementations of logical power throttling where the number of processor cycles decoded in a processor cycle is decreased.
Figure 4B:
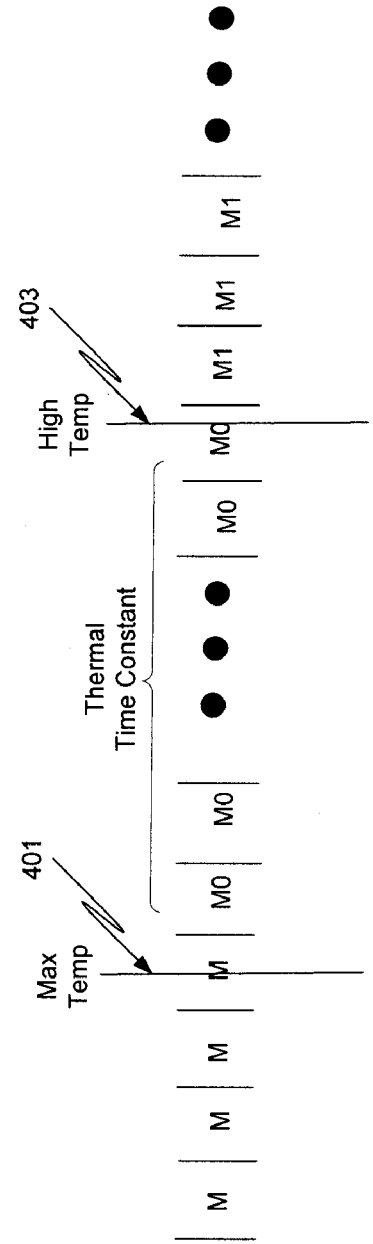

The example of FIG. 4B is similar to FIG. 4A, except when logical power throttling unit 203 samples the temperature signal after the thermal time constant, maximum temperature signal 403 is detected. In this example, logical power throttling unit 203 configures decode pipe 213 to decode M1 instruction every processor cycle where M1 is less than M0 and M1 is an integer. After another thermal time constant, logical power throttling unit 203 samples the temperature signal and continues based on that temperature signal.

The examples in FIGS. 4A and 4B are illustrative only and are not intended to limit the invention to the specific embodiments disclosed. In view of this disclosure, one of skill can adjust the average number of decodes per processor cycle to achieve a power reduction by decoding a specified number of instructions per processor cycle. For example, in one example, M is four and M0 is one.

In yet another example, during normal processing M instructions are decoded per processor cycle by decode pipe 213, where M is an integer and in one embodiment is four. When logical power throttling unit 203 receives maximum temperature signal 501, logical power throttling unit 203 configures decode pipe 213 to decode M0 instructions every other processor cycle as shown in FIG. 5A, where M0 is less than M and M0 is an integer.

Decode pipe 213 continues decoding M0 instructions every other processor cycle+ for a thermal time constant. At the end of the thermal time constant, logical power throttling unit 203 samples the temperature signal and detects normal temperature signal 502. Thus, decode pipe 213 returns to decoding M instructions per processor cycle.

The example of FIG. 5B is similar to FIG. 5A, except when logical power throttling unit 203 samples the temperature signal after the thermal time constant, maximum temperature signal 503 is detected. In this example, logical power throttling unit 203 configures decode pipe 213 to decode M0 instructions every third processor cycle.

The example of FIG. 5C also is similar to FIG. 5A, except when logical power throttling unit 203 samples the temperature signal after the thermal time constant, maximum temperature signal 504 is detected. In this example, logical power throttling unit 203 configures decode pipe 213 to decode M1 instruction every third processor cycle where M1 is less than M0.

The examples in FIGS. 5A to 5C are illustrative only and are not intended to limit the invention to the specific embodiments disclosed. In view of this disclosure, one of skill can adjust the number of instructions decoded per processor cycle to achieve a power reduction by decoding a specified number of instructions after a specified number of processor cycles where the specified number of instructions is less than the normal number of instructions decoded.

Also, in FIGS. 3A, 3B, 4A, 4B, and 5A to 5C, the two states associated with the power throttling output signal were indicative of a temperature. However, these examples are applicable to any power throttling output signal having at least two states and so are applicable to the other examples provided below where the power throttling output signal is indicative of a parameter other than temperature.

Also, the normal state in theses Figures was shown starting at the left hand side of each Figure and the Figure was interpreted going from left to right. However, for the instruction execution throttling described more completely below, when the number of instructions being decoded is increased in response to a power throttling output signal, the state prior to that signal can be taken as shown at the right hand side of these figures and then going from right to left shows the number of instructions being decoded being increased. Thus, these Figures are not repeated for each different aspect of this invention.

In the above example, a temperature signal was used to determine when to logically throttle the number of instructions processed by pipeline 100 per processor cycle. However, in some uses of processor 100, it may be desirable to reduce power consumption during specific time periods. For this application, the temperatures are replaced with a start time and a stop time and the time of day is compared with the two times. When the time of day is between the start time and the stop time, at least one of the above described techniques is used to logically throttle pipeline 100 and thereby reduce the power consumption of the chip.

Figure 6A:
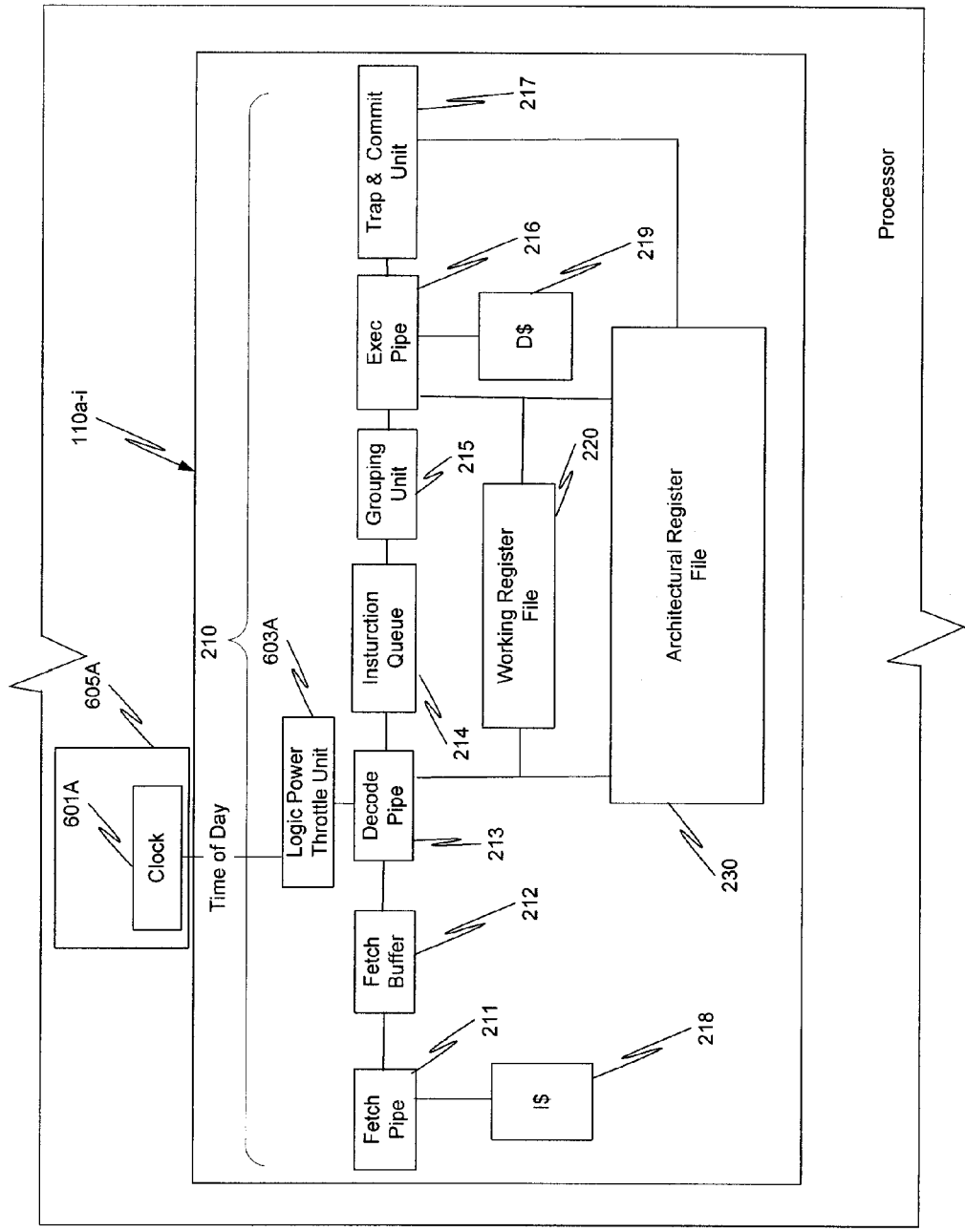
FIG. 6A is a more detailed block diagram of a representative core of processor of FIG. 1 according to one embodiment of the invention where a time of day signal is used in the logical power throttling.
Figure 7A:
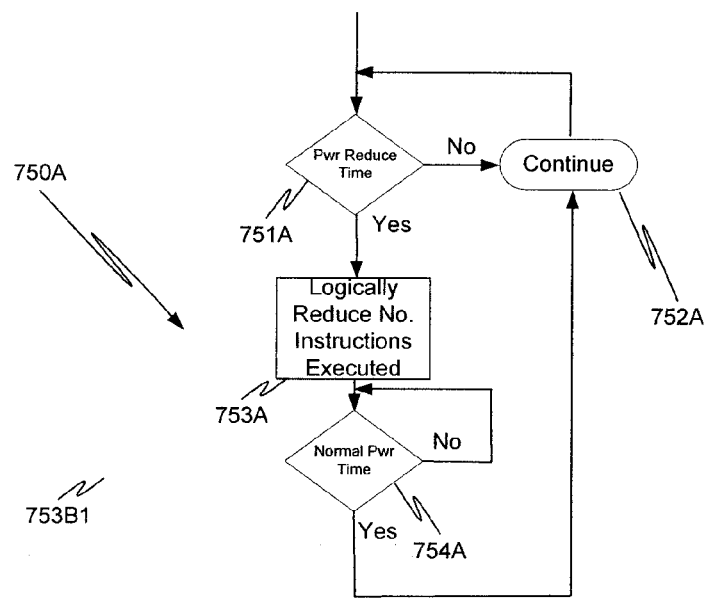
FIG. 7A is a process flow diagram for one embodiment of a method used to implement logical power throttling in the core of FIG. 6A.

Thus, in one embodiment, a device 605A (FIG. 6A) includes a clock 601A that provides a time of day signal, as the power throttling output signal, to a logical power throttling unit 603A in a core 110a-i that in turn includes pipeline 210 as described above. In this embodiment, method 750A (FIG. 7A) is used to logically throttle the power consumption by core 110a-i.

Power reduction time check operation 751A determines whether the time of day signal is in a power reduction time period for which power consumption is to be reduced. If the time of day signal is not in the power reduction time period, processing continues normally as represented by continue 752A.

When the time of day signal is in the power reduction time period, check operation 751A transfers processing to logically reduce number of instructions executed process 753A. Thus, power reduction time check operation 751A monitors the state of the power throttling output signal from device 605A. When the power throttling output signal has a first state, e.g., a time not in the power reduction time period, pipeline 210 continues to operate normally. However, when the power throttling output signal has the second state, e.g., a time in the power reduction time period, logical power throttling unit 203 causes the power consumption to be reduced.

Specifically, in this embodiment, logically reduce number of instruction executed process 753A throttles a number of executions decoded for execution by causing decode pipe 213 to reduce the average number of instructions decoded in a processor cycle as described above for process 253 and incorporated herein by reference.

Check operation 754A waits for a time of day signal, e.g., a power throttling output signal, that is not in the power reduction time period and when such a signal is detected transfers to continue operation 752A and core 110a-i resumes normal decoding and execution with no reduction in the number of instructions decoded in a single processor cycle.

Process 750A is illustrative only and should not be interpreted as requiring polling by either check operation 751A or check operation 754A. For example, events could be used to implement the checks so that processing continued normally until a first time of day event is indicated. Upon indication of the first time of day event, the number of instructions executed in the pipeline is logically throttled until a second time of day event occurs and then processing returns to normal.

Also, the power throttling output signal from device 605A is not limited to a time-of-day signal. For example, device 605A could provide a binary power throttling output signal which has a first state that indicates normal operation, and a second state that indicates reduced power operation. In this embodiment, the check operations in process 750A determine the state of the power throttling output signal and transfer operation based on the state of the power throttling output signal.

In the above examples, a temperature signal or a time of day signal was used to determine when to logically throttle the number of instructions processed by pipeline 210 per single processor cycle. However, in some uses of processor 100, it may be desirable to use the power throttling capability for other uses such as load balancing between cores 110-1 to 110-N (FIG. 1).

For example, when one core is falling behind in executing instructions and at least one other core is running ahead in executing instruction, executing code on processor 100 can generate a first power throttling output signal that causes the core running ahead to reduce the number of instructions decoded in a given time period and a second power throttling output signal that causes the core running behind to increase the number of instructions decoded in a given time period if that number is not at a maximum. If the core falling behind is decoding the maximum number of instructions in a given time period, the number of instructions being decoded is not increased, but the reduction in decoding by the core or cores should reduce the load on common resources and so allow the core running behind relatively more access to those common resources. Thus, the logical power throttling capability can also be used to address load balancing between cores on a single chip, for example.

Figure 6B:
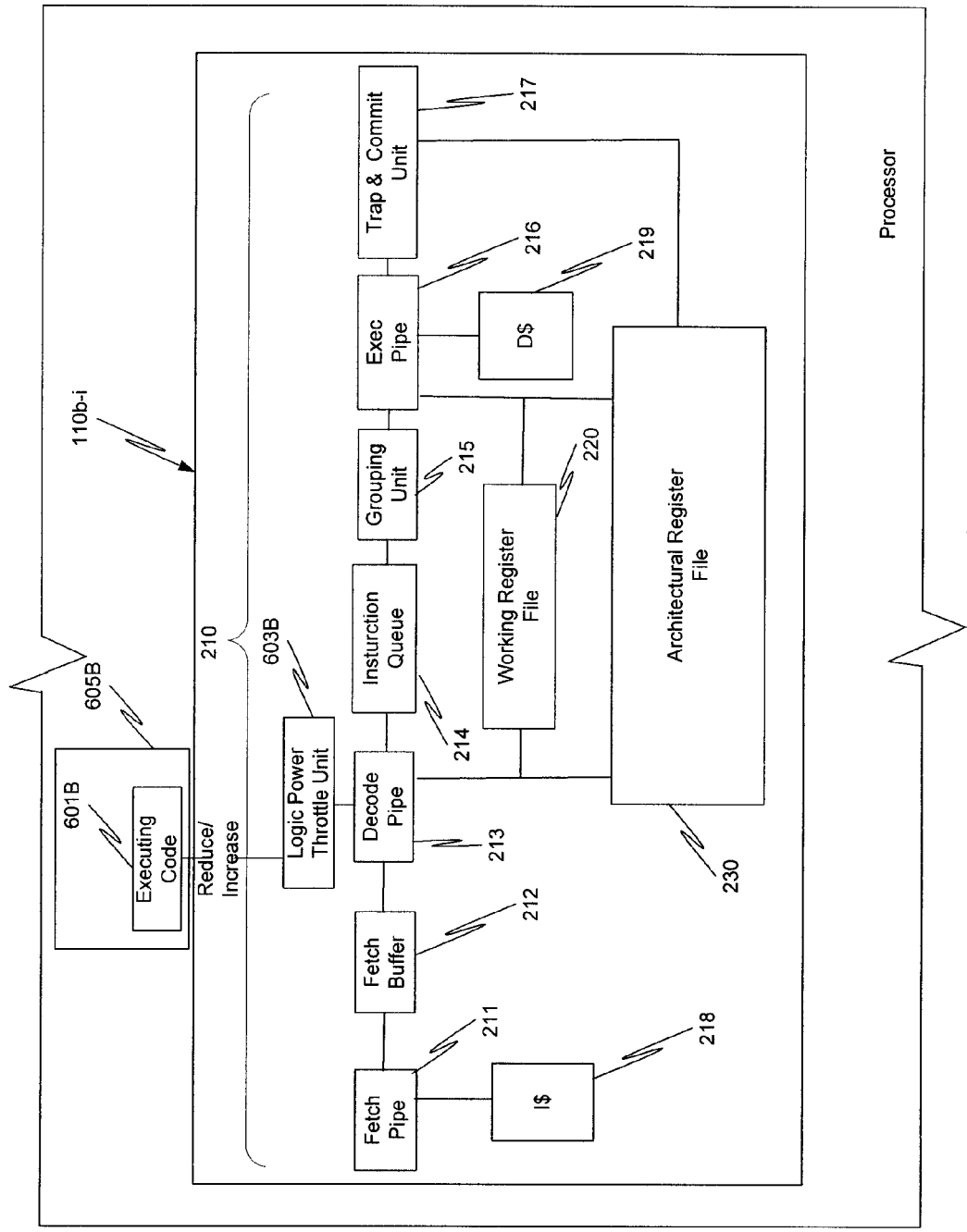
FIG. 6B is a more detailed block diagram of a representative core of processor of FIG. 1 according to one embodiment of the invention where a change number of instructions executed signal is used in the logical power throttling.

Thus, in one embodiment, a device 605B (FIG. 6B) includes executing code 601B, e.g., a part of the operating system, that causes a power throttling output signal to be provided to a logical power throttling unit 603B in a core 110a-i that in turn includes pipeline 210 as described above. An independent power throttling output signal is provided by device 605B to each core on the chip so that the processing by each core can be independently controlled.

Figure 7B:
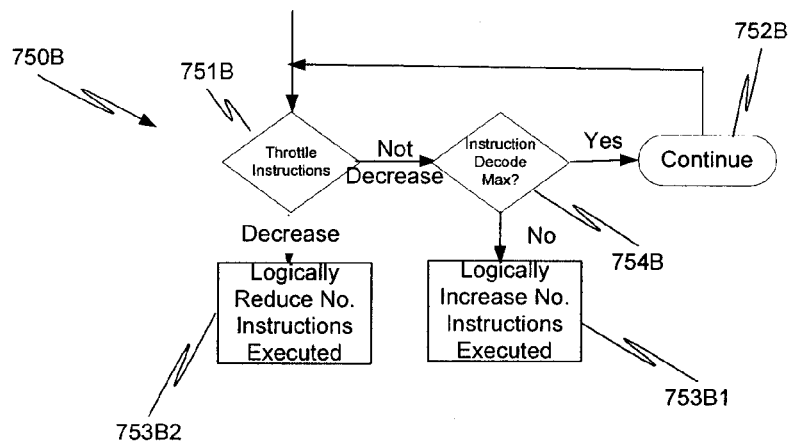
FIG. 7B is a process flow diagram for one embodiment of a method used to implement logical power throttling in the core of FIG. 6B.

In this embodiment, method 750B (FIG. 7B) is used to logically throttle the number of instructions decoded in a given time period by a particular core. See FIGS. 3A, 3B, 4A, 4B, and 5A to 5C for examples of such logical throttling. As mentioned above, each core in the processor is independently controlled in this embodiment and so a representative core 110b-i is considered.

Throttle instructions check operation 7513 determines whether the power throttling output signal is (i) a reduce instruction execution load signal, or (ii) an increase instruction execution load signal, i.e., determines whether the power throttling output signal has a first state or a second state. If the power throttling output signal is an increase instruction execution load signal, i.e., has the second state, throttle instructions check operation 751B transfers processing to instruction decode maximum check operation 754B. If decode pipe 213 is decoding a maximum number of instructions, check operation transfers to continue 752A and processing continues normally. However, if decode pipe 213 is decoding less than a maximum number of instructions, check operation 254B transfers to logically increase number of instructions executed process 753B1 that increases the number of instructions being decoded by decode pipe 213 is a given time period.

If the power throttling output signal is a reduce instruction execution load signal, check operation 751B transfers processing to logically reduce number of instructions executed process 753B2. Thus, throttle instructions check operation 751B monitors the state of the power throttling output signal from device 605B. When the power throttling output signal has a first state, check operation 751B transfers to check operation 754B and if the instruction execution load is at a maximum, nothing is done, but if the instruction execution load is less than the maximum, the number of instructions decoded in a given time period is increased. However, when power throttling output signal has a second state, e.g., a state indicative of reducing the instruction execution load, logical power throttling unit 603B causes the number of instructions decoded in a given time period to be reduced.

Specifically, in this embodiment, logically reduce number of instruction executed process 753B2 throttles a number of instructions decoded for execution by causing decode pipe 213 to reduce the average number of instructions decoded in a given time period as described above for process 253 and incorporated herein by reference.

Alternatively, in this embodiment, logically increase number of instruction executed process 753B1 throttles a number of instructions decoded for execution by causing decode pipe 213 to increase the average number of instructions decoded in a given time period. This process is the inverse of that described above for process 253 and incorporated herein by reference, e.g., a larger number of instructions is decoded in a single processor cycle, the number of processor cycles between processor cycles in which decoding is performed is decreased, or both are done.

Process 750B is illustrative only and should not be interpreted as requiring polling by either check operation 751B or check operation 754B. Again, for example, events could be used to implement the checks so that processing continues normally until a power throttling output signal indicating a change in the number of instructions to be decoded is received. Upon indication of the event, the number of instructions executed in the pipeline is logically throttled in an appropriate direction. The power throttling capability based upon the instruction execution workload between cores provides a unique method for performing loading balancing between cores on a single chip, for example.

Figure 8:
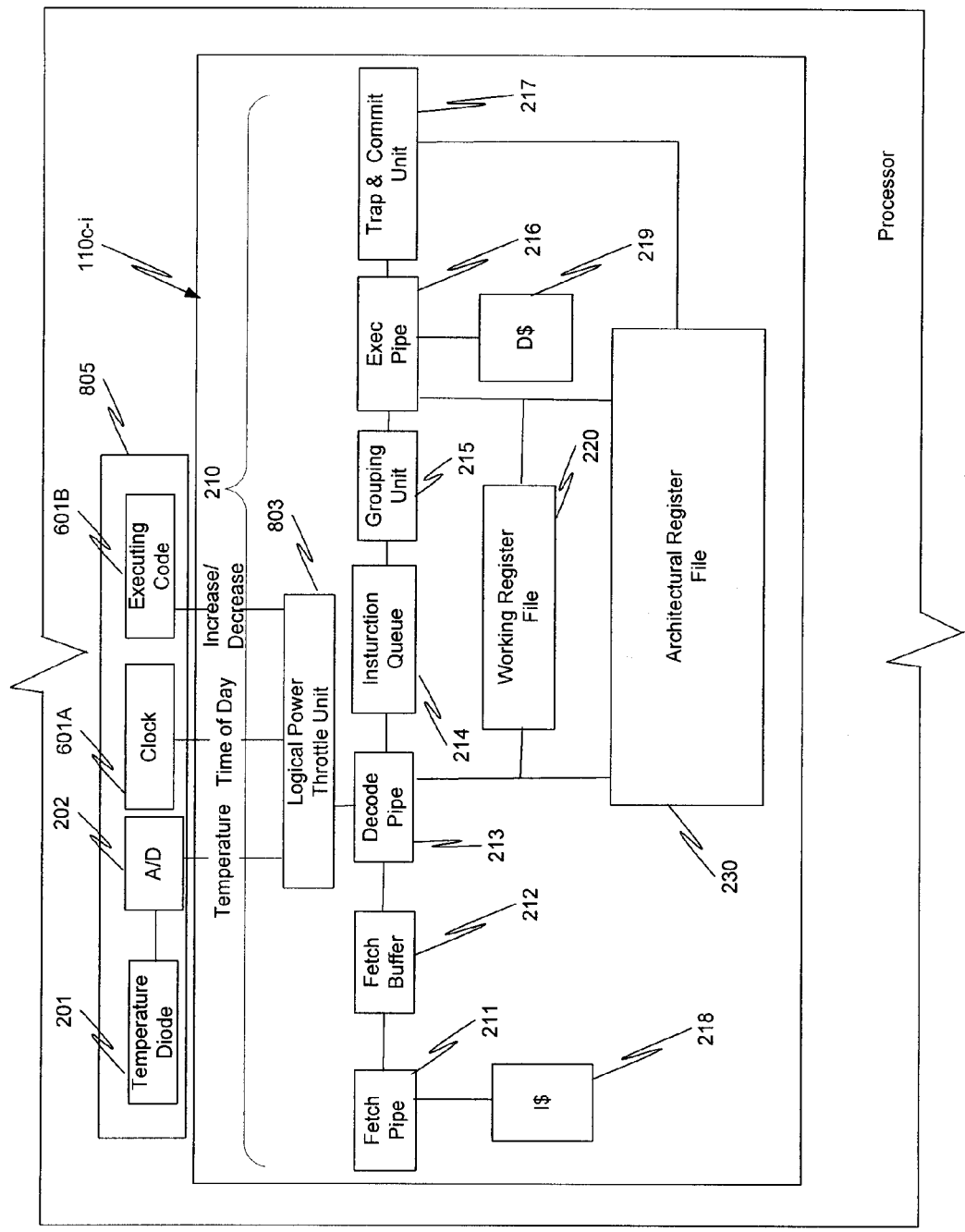
FIG. 8 is a more detailed block diagram of a representative core of processor of FIG. 1 according to one embodiment of the invention where any one, all or any combination of a temperature signal, a time of day signal, and a change number of instructions executed signal are used in the logical power throttling.

In yet another embodiment, a device 805 (FIG. 8) includes a clock 601A that provides a first power throttling output signal to a logical power throttling unit 803 in a core 110c-i, a temperature diode 201 and analog to digital converter 202 that provide a second power throttling output signal to logical power throttling unit 803 as well as executing code 601B that provides a third power throttling output signal to logical power throttling unit 803. Core 110c-i includes pipeline 210 as described above. In this example, method 250, method 750A and method 750B, or any combination thereof are used to logically throttle power consumption.

The above embodiments are illustrative only and are not intended to limit the invention to the specific embodiments illustrated. In view of this disclosure, those of skill in the art can implement the logical power throttling in a variety of ways. For example, if the cores in processor 100 are clustered, the logical power throttling can be implemented on a per cluster basis so that each pipeline in the cluster is logically throttled in the same way. Alternatively, only selected pipelines in the cluster could be logically throttled. Also, the logical power throttling unit can be incorporated within elements in the pipeline and so may not be implemented as a separate discrete unit as shown in the drawings.

Finally, in the above examples, it was assumed that instructions were decoded in every processor cycle. However, as is known to those of skill, there may be some processor cycles in which no instructions are decoded and so the average number of instructions decoded per processor cycle may be less than that obtained using the above examples.

Figure 9:
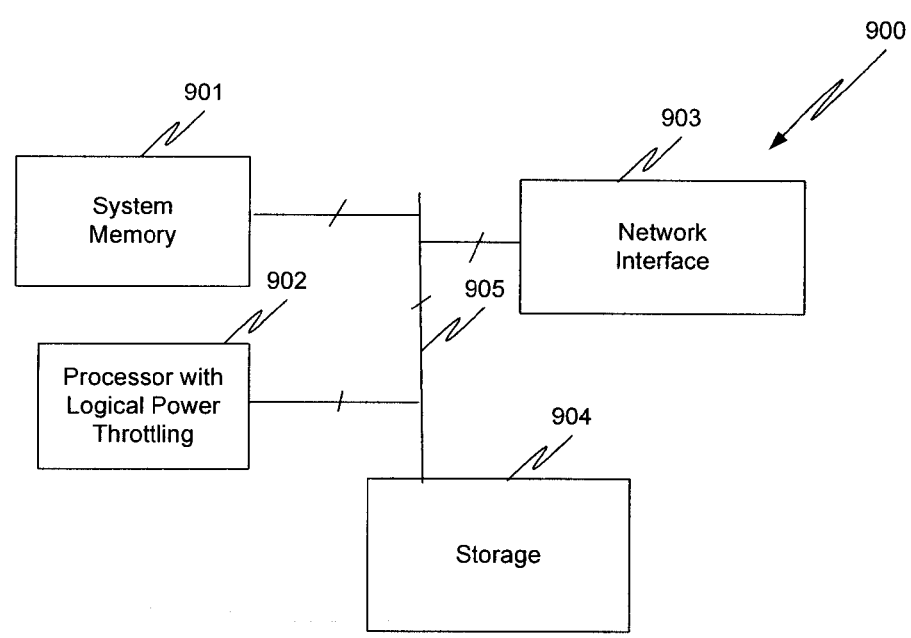
FIG. 9 is block diagram of a system that includes a processor that utilizes logical power throttling according to an embodiment of this invention.

FIG. 9 depicts an example of a computer system 900 constructed according to various aspects of the present invention. Computer system 900 includes a processor with logical power throttling 902, which may include multiple cores, a single threaded processor, a multi-threaded processor, etc., which implements one or more of pipelines 210 with at least one embodiment of the logical power throttling described herein. In one embodiment computer system 900 is a stand alone system, while in another embodiment computer system 900 is a server computer that is networked and is part of a client-server system.

Computer system 900 also includes system memory 901, e.g., one or more cache levels, SRAM, DRAM, RDRAM, EDO RAM, DDR RAM, and/or EEPROM, etc., a system bus 905 (e.g., LDT, PCI, ISA, etc.), a network interface 903 (e.g., an ATM interface, an Ethernet interface, a Frame Relay interface, etc.), and storage 904, e.g., optical storage, magnetic storage, etc.

Computer system realizations of the invention may include fewer or additional components not illustrated in FIG. 9. For example, computer system 900 may also include a video card, an audio card, additional network interfaces, peripheral devices, etc. Processor 902, storage 904, network interface 903 and system memory 901 are coupled to system bus 905, which includes a plurality of address, data and control lines. Processor 902 includes instruction store 218 and a memory interface that couples the instruction store 218 to a memory hierarchy, i.e., system memory 901. It should be appreciated that the computing apparatus described herein may be embodied as a design file representation including machine readable instructions encoded on one or more computer readable media.

We claim:

1. A processor comprising:
   a device providing a power throttling output signal;
   a pipeline having a decode pipe; and
   a logical power throttling unit coupled to the device to receive the power throttling output signal, and to the decode pipe to control a rate of execution of instructions therein, whereupon determining that the power throttling output signal satisfies a predetermined criterion, the logical power throttling unit causes the decode pipe to one or both
     increase the number of idle processor cycles between processor cycles in which instructions are decoded, and
     decrease the number of instructions decoded in a processor cycle,
   to reduce, for a duration of a thermal time constant, an average number of instructions decoded per processor cycle without physically changing any of a processor cycle time and processor supply voltage levels, and
   wherein upon expiration of the thermal time constant, the power throttling output signal is determined again, and used to further control the rate of execution of instructions by retaining, increasing, or further reducing the rate.

2. The processor of claim 1 wherein the average number of instructions decoded per processor cycle is reduced by increasing the number of idle processor cycles between processor cycles in which instructions are decoded.

3. The processor of claim 1 wherein the average number of instructions decoded per processor cycle is reduced by decreasing the number of instructions decoded in a processor cycle.

4. The processor of claim 1 wherein, prior to receiving the output signal satisfying the predetermined criterion, the decode pipe decodes M instructions in each processor cycle in which instructions are decoded; and following the receiving the output signal satisfying the predetermined criterion, the decode pipe decodes M0 instructions in each processor cycle in which instructions are decoded, wherein M0 is less than M, and M and M0 are integers.

5. The processor of claim 4 wherein M is four and M0 is one.

6. The processor of claim 1 wherein,
   said device comprises a temperature sensor;
   said power throttling output signal is indicative of a temperature; and
   said predetermined criterion is the temperature is equal to or greater than a maximum temperature.

7. The processor of claim 1 wherein,
   said device comprises a clock;
   said power throttling output signal is indicative of a time of day; and
   said predetermined criterion is the time of day is the after a power reduction start time and before a power reduction end time.

8. The processor of claim 1 wherein,
   said device comprises executing computer code;
   said power throttling output signal is indicative of instruction execution load; and said predetermined criterion is one of an increase in said instruction execution load and a decrease in said instruction execution load.

9. The processor of claim 8 wherein said processor includes a plurality of cores, and further wherein at least one of said plurality of cores includes said logical power throttling unit and said power throttling output signal has a first state;

another one of said plurality of cores includes a second logical power throttling unit and said second logical power throttling unit receives a power throttling signal having a second state, where said second state is different from said first state.

10. A method of logically throttling power consumption by a computer processor comprising:

monitoring a power throttling output signal having at least two states, wherein a first state is indicative of normal operation and a second state is different from said first state;

one or both of increasing the number of idle processor cycles between processor cycles in which instructions are decoded, and decreasing the number of instructions decoded in a processor cycle, to control decoding, for a duration of a thermal time constant, in a decode pipe in a pipeline of the computer processor, a first average rate of instructions per processor cycle when the signal has the first state; and one or both of decreasing the number of idle processor cycles between processor cycles in which instructions are decoded, and increasing the number of instructions decoded in a processor cycle, to control decoding, for a duration of the thermal time constant, in the decode pipe, a second average rate of instructions per processor cycle when the signal has the second state wherein the first average number is different from the second average number;

wherein upon expiration of the thermal time constant, the power throttling output signal is determined again, and used to further control the rate of execution of instructions by retaining, increasing, or further reducing the rate.

11. The method of claim 10 wherein the decoding, in the decode pipe, a second average number of instructions per processor cycle comprises:

increasing the number of processor cycles between processor cycles in which instructions are decoded.

12. The method of claim 10 wherein the decoding, in the decode pipe, a second average number of instructions per processor cycle comprises:

decreasing the number of instructions decoded in a single processor cycle.

13. The method of claim 12 where the decreasing comprises:

decreasing from M instructions decoded in a single processor cycle to M0 instructions in a single processor cycle, wherein M0 is less than M, and M and M0 are integers.

14. The method of claim 13 wherein M is four and M0 is one.

15. The method of claim 10 wherein, said power throttling output signal is indicative of a temperature; and said second state is indicative of the temperature being equal to or greater than a maximum temperature.

16. The method of claim 10 wherein, said power throttling output signal is indicative of a time of day; and said second state is indicative of the time of day being after a power reduction start time and before a power reduction end time.

17. The method of claim 10 wherein, said power throttling output signal is indicative of an instruction execution workload for at least one core in said computer processor; and said second state is indicative of a change in said instruction execution workload.

18. A system comprising:

a memory; and a processor, coupled to the memory, comprising:

a device providing a power throttling output signal;

a pipeline having a decode pipe; and a logical power throttling unit coupled to the device to receive the power throttling output signal, and to the decode pipe to control a rate of execution of instructions therein, whereupon determining that the power throttling output signal satisfies a predetermined criterion, the logical power throttling unit causes the decode pipe to one or both increase the number of idle processor cycles between processor cycles in which instructions are decoded, and decrease the number of instructions decoded in a processor cycle, to reduce, for a duration of a thermal time constant, an average number of instructions decoded per processor cycle without physically changing any of a processor cycle time and processor supply voltage levels, and wherein upon expiration of the thermal time constant, the power throttling output signal is determined again, and used to further control the rate of execution of instructions by retaining, increasing, or further reducing the rate.

19. The system of claim 18 further wherein said pipeline is included in at least one core of a plurality of cores of said processor.

* * * * *